US012572659B2

(12) United States Patent
Hajmasan et al.

(10) Patent No.: US 12,572,659 B2
(45) Date of Patent: Mar. 10, 2026

(54) ENTITY PROFILE SIGNATURES FOR IMPROVING MALWARE DETECTION

(71) Applicant: Bitdefender IPR Management Ltd., Nicosia (CY)

(72) Inventors: Gheorghe F. Hajmasan, Cluj-Napoca (RO); Radu M. Portase, Cluj-Napoca (RO); Alexandra Hajmasan, Cluj-Napoca (RO)

(73) Assignee: Bitdefender IPR Management Ltd., Nicosia (CY)

( * ) Notice: Subject to any disclaimer, the term of this patent is extended or adjusted under 35 U.S.C. 154(b) by 130 days.

(21) Appl. No.: 18/601,012

(22) Filed: Mar. 11, 2024

(65) Prior Publication Data

US 2025/0284804 A1 Sep. 11, 2025

(51) Int. Cl.
*G06F 21/00* (2013.01)
*G06F 21/56* (2013.01)

(52) U.S. Cl.
CPC ...... *G06F 21/566* (2013.01); *G06F 2221/033* (2013.01)

(58) Field of Classification Search
CPC .. G06F 21/566; G06F 21/552; G06F 11/3062; H04L 67/12
See application file for complete search history.

(56) References Cited

U.S. PATENT DOCUMENTS

| | | | |
|---|---|---|---|
| 10,148,686 B2 | 12/2018 | Hassanzadeh | |
| 10,176,329 B2 | 1/2019 | Chen | |
| 11,159,538 B2 * | 10/2021 | Wang | G06F 21/566 |
| 2022/0114260 A1 | 4/2022 | Udupi Raghavendra | |
| 2024/0296222 A1 * | 9/2024 | Portase | G06F 21/566 |

FOREIGN PATENT DOCUMENTS

| | | | | |
|---|---|---|---|---|
| CA | 3219129 A1 * | 11/2022 | ........... | G06F 21/554 |
| CN | 106161381 A * | 11/2016 | ......... | H04L 63/1416 |

* cited by examiner

*Primary Examiner* — Tri M Tran
(74) *Attorney, Agent, or Firm* — Law Office of Andrei D Popovici, PC

(57) ABSTRACT

A malware detection engine monitors the behavior of a software entity. Meanwhile, outside of the malware detection engine, an engine steering module dumps a profile of the software entity, for instance as a text file listing current values of state and behavioral attributes characterizing the respective software entity. The entity profile is then checked against a set of pre-defined signatures. In response to a signature match, the engine steering module re-configures a manner in which the malware detection engine monitors the software entity, for instance causing the malware detection engine to switch from using a set of simple heuristics to using a more sophisticated malware detection model. Such signature matching performed outside of a currently executing detection engine enables fast development and testing of new detection models and heuristics, for subsequent implementation into the engine itself.

23 Claims, 10 Drawing Sheets

```
{
    "RuleVersion": 1,

"MatchPredicates": {
        "ProcessInfo.ProcessName": {"String", "REGEXP", "1\\.exe$"},
        "ProcessInfo.VersionInfo.FileDescription": {"String", "!contains",
            "updater"},
        "ProcessInfo.FileSize": {"Hex", ">" "0x20000"},
        "ProcessTree[2].ProcessName": {"String", "equals", "winword.exe"}, "Heuristics": [
            {
                "HeurId": {"Hex", "==", "ATC_HEUR_2"},
                "IsExcepted": {"Boolean", "==", false},
                "Qword1": {"Hex", ">", "0x5"}
            },
            {
                "HeurId": {"Hex", "==", "ATC_HEUR_3"},
                "String2": {"String", "contains", "encrypted"}
            }
        ]
    }, "ActionsOnMatch": [
        "SetHeuristic": [
            {
                "Process": "ProcessInfo.InternalId",
                "HeurId": "ATC_HEUR_4",
                "Points": 35,
                "Real": false,
            },
            {
                "Process": "ProcessTree[2].InternalId",
                "HeurId": "ATC_HEUR_5",
                "Points": 15,
                "Real": false,
            }
        ],
        "SetMalwareFamily": "Ransomware.Rocky",
        "ForAllObjectsThatMatch": {
            "IterratedArray": "Heuristics",
            "IfItemMatch": {
                "HeurId": {"Hex", "==", "ATC_HEUR_ITER"},
                "String1": {"String", "contains", "updater"}
            },
            "ActionsOnItem": ["ExceptHeuristic"]
        },
    ]
}
```

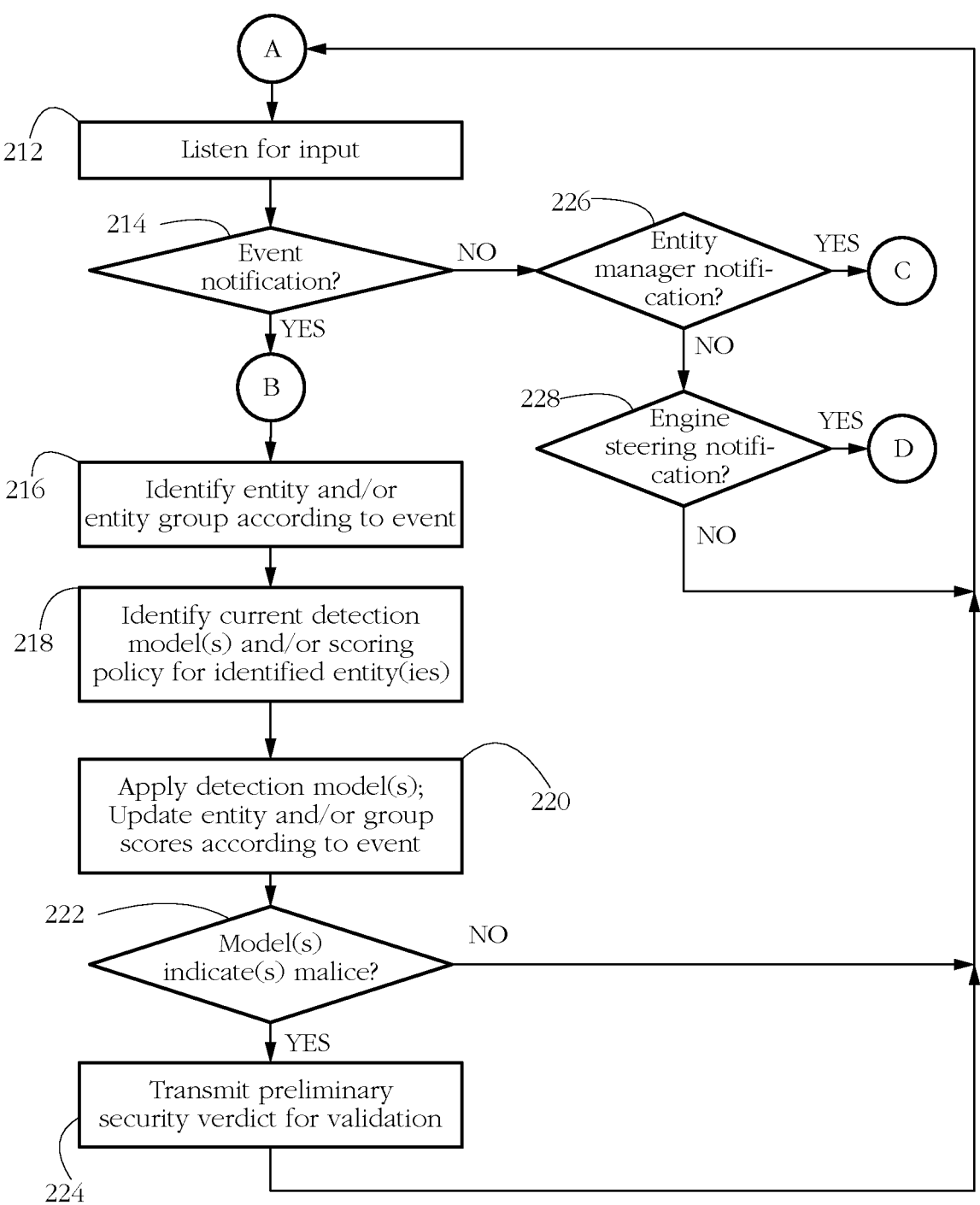
FIG. 7-A

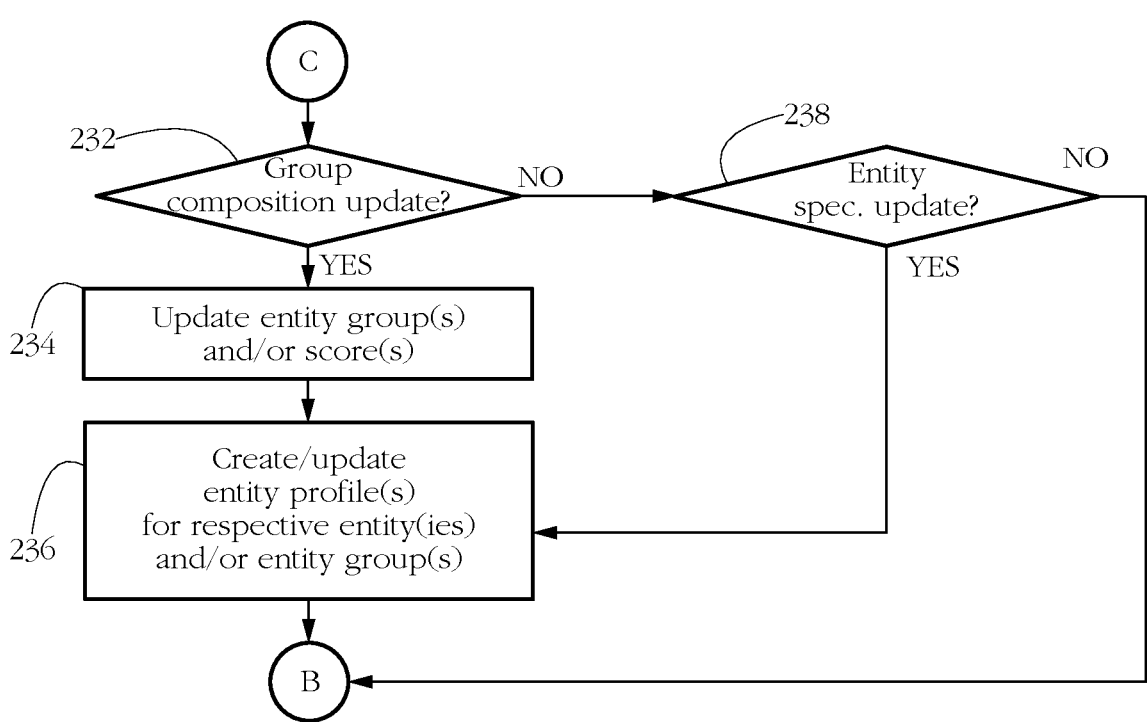
FIG. 7-B
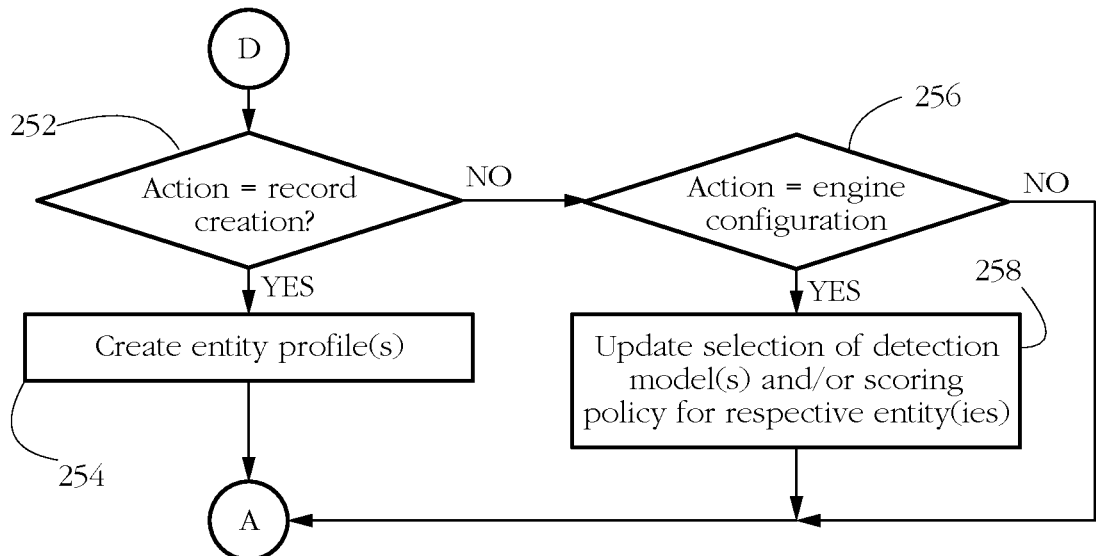
FIG. 7-C

ENTITY PROFILE SIGNATURES FOR IMPROVING MALWARE DETECTION

BACKGROUND OF THE INVENTION

The invention relates to computer security, and in particular to detecting malicious software (malware).

Malicious software, also known as malware, affects a great number of computer systems worldwide. In its many forms such as computer viruses, worms, rootkits, unsolicited adware, ransomware, and spyware, malware presents a serious risk to millions of computer users, making them vulnerable to extortion, loss of data and sensitive information, identity theft, and loss of productivity, among others. Malware may further display material that is considered by some users to be obscene, excessively violent, harassing, or otherwise objectionable. The explosive growth in mobile computing has only exacerbated exposure and the associated risks, with millions of devices such as smartphones and tablet computers constantly connected to the Internet and acting as potential targets for malware.

Security software may be used to detect malware infecting a user's computer system, and additionally to remove or prevent the execution of such malware. Conventional malware-detection techniques are generally divided into two categories. A first category of methods known as static scanning rely on matching a fragment of code of the malware agent to a library of malware-indicative signature patterns. Another category of methods commonly known as dynamic or behavioral scanning detect malware-indicative behaviors, such as a suspicious sequence of actions performed by the malware agent. Modern anti-malware methods typically use artificial intelligence (AI) technologies to facilitate behavior detection and/or code pattern matching.

Implementing such security methods may place a heavy computational burden on a user's computing device, negatively impacting productivity and user experience. In addition, security software faces the difficult task of keeping up with a rapidly evolving world of threats, wherein new agents and variants emerge on the scale of a few hours or days and wherein some advanced malware uses sophisticated strategies to avoid detection. There is therefore an ongoing interest in developing robust and efficient systems and methods of countering computer security threats.

SUMMARY OF THE INVENTION

According to one aspect, a computer system comprises at least one hardware processor configured to execute a malware detection engine and an engine steering module connected to the malware detection engine. The malware detection engine is configured to monitor a behavior of a target software entity executing on the computer system to determine whether the target entity is malicious. The engine steering module is configured to, in response to a trigger event caused by the target software entity, initiate writing of an entity profile of the target software entity to a non-volatile storage medium of the computer system, the entity profile comprising a plurality of attribute values characterizing the behavior of the target software entity. The engine steering module is further configured to parse the entity profile to determine whether the entity profile matches a pre-determined profile signature, and in response to a determination that the entity profile matches the profile signature, reconfigure the malware detection engine according to the profile signature to alter a procedure of monitoring the behavior of the target software entity.

According to another aspect, a computer security method comprises employing at least one hardware processor of a computer system to execute a malware detection engine and an engine steering module connected to malware detection engine. Executing the malware detection engine comprises monitoring a behavior of a target software entity executing on the computer system to determine whether the target entity is malicious. Executing the engine steering module comprises, in response to a trigger event caused by the target software entity, initiating writing of an entity profile of the target software entity to a non-volatile storage medium of the computer system, the entity profile comprising a plurality of attribute values characterizing the behavior of the target software entity. Executing the engine steering module further comprises parsing the entity profile to determine whether the entity profile matches a pre-determined profile signature, and in response to a determination that the entity profile matches the profile signature, re-configuring the malware detection engine according to the profile signature to alter a procedure of monitoring the behavior of the target software entity.

According to another aspect, a non-transitory computer readable medium stores instructions which, when executed by at least one hardware processor of a computer system, causes the computer system to form a malware detection engine and an engine steering module connected to the malware detection engine. The malware detection engine is configured to monitor a behavior of a target software entity executing on the computer system to determine whether the target entity is malicious. The engine steering module is configured to, in response to a trigger event caused by the target software entity, initiate writing of an entity profile of the target software entity to a non-volatile storage medium of the computer system, the entity profile comprising a plurality of attribute values characterizing the behavior of the target software entity. The engine steering module is further configured to parse the entity profile to determine whether the entity profile matches a pre-determined profile signature, and in response to a determination that the entity profile matches the profile signature, re-configure the malware detection engine according to the profile signature to alter a procedure of monitoring the behavior of the target software entity.

BRIEF DESCRIPTION OF DRAWINGS

The foregoing aspects and advantages of the present invention will become better understood upon reading the following detailed description and upon reference to the drawings where:

FIG. 5 shows an exemplary profile signature according to some embodiments of the present invention.

FIG. 7-A shows an exemplary sequence of steps performed by a malware detection engine according to some embodiments of the present invention.

FIG. 7-B shows another exemplary sequence of steps performed by the malware detection engine according to some embodiments of the present invention.

FIG. 7-C shows yet another exemplary sequence of steps performed by the malware detection engine according to some embodiments of the present invention.

Figure 8:
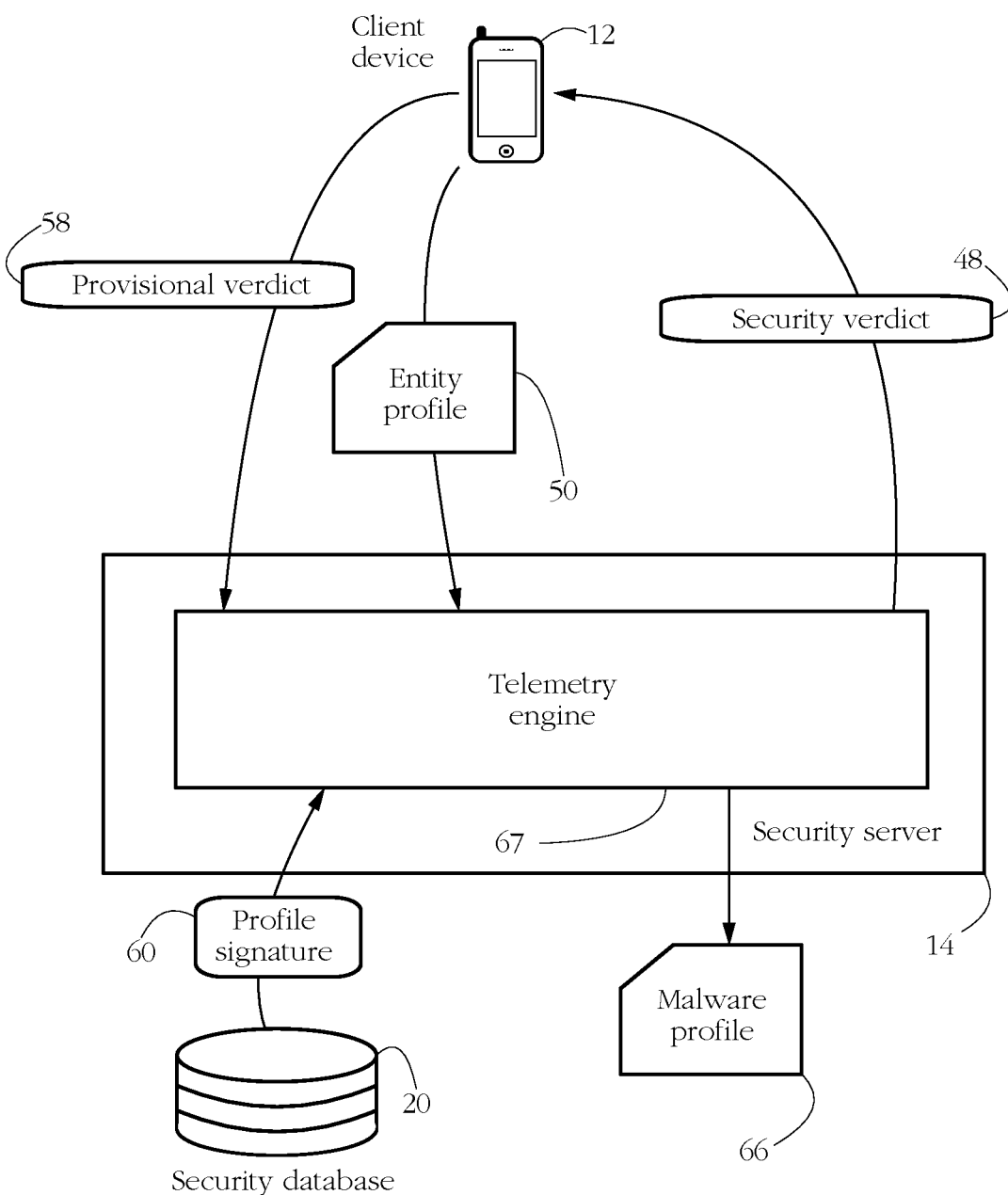

FIG. 8 shows an alternative exemplary embodiment wherein a telemetry engine performs signature matching procedures on a remote security server.

Figure 9:
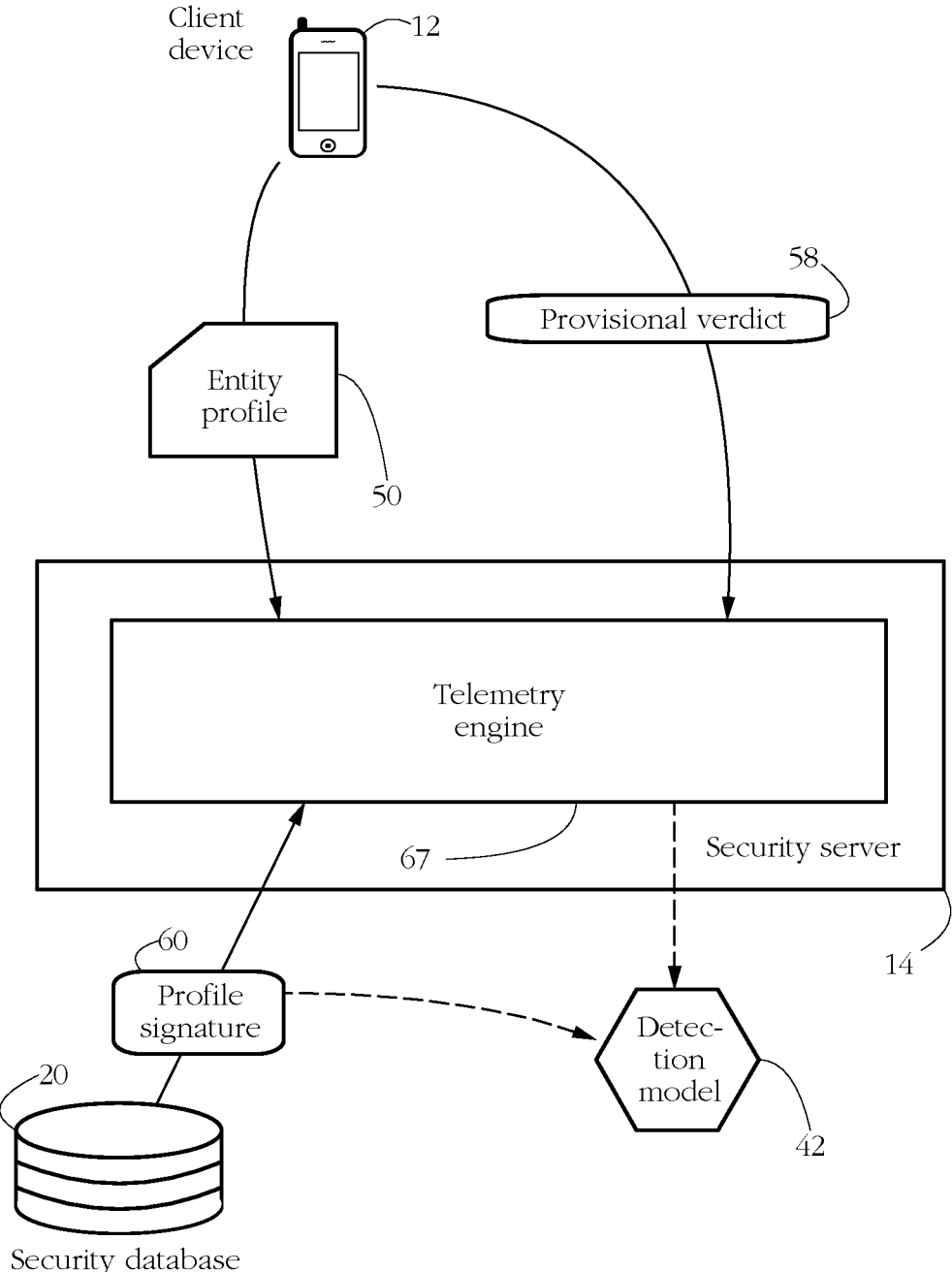

FIG. 9 shows another alternative exemplary embodiment used for updating and/or deriving malware detection models.

Figure 10:
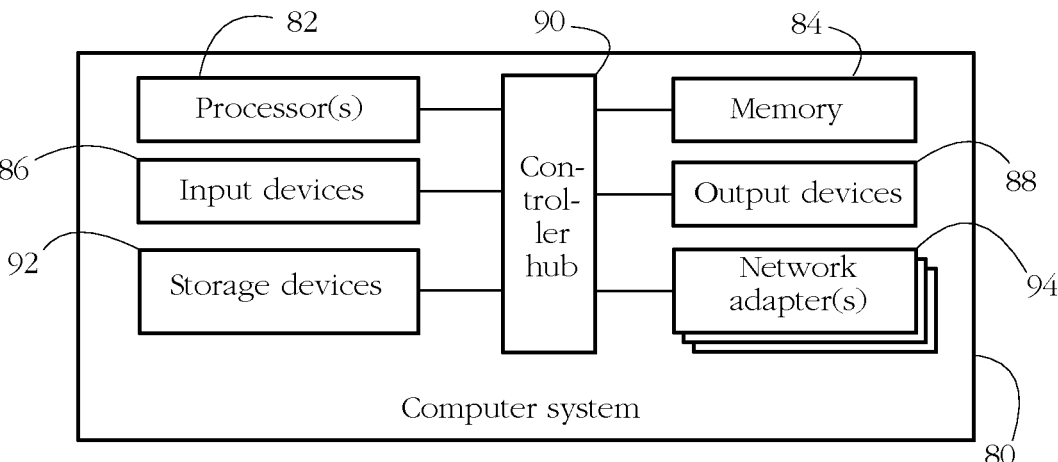

FIG. 10 shows an exemplary hardware configuration of a computer system programmed to execute some of the methods described herein.

DETAILED DESCRIPTION OF THE INVENTION

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Any use of 'or' is meant as a nonexclusive or. Unless otherwise required, any described method steps need not be necessarily performed in a particular illustrated order. A first element (e.g., data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Unless otherwise specified, a process is an instance of a computer program and is characterized by having at least an execution thread and a virtual memory space assigned to it, wherein a content of the respective virtual memory space includes executable code. A database herein denotes any organized, searchable collection of data. A predicate herein denotes a statement that has a variable degree of truth depending on the values of its variables. Evaluating a predicate comprises determining the truth value of the respective predicate. A heuristic herein denotes a set of rules for determining whether a software entity is malicious. A text file is a computer file storing alphanumeric content encoded using a character encoding standard such as ASCII or Unicode, among others. The term 'text file' is used herein to distinguish from binary files, which contain mostly non-text data (e.g., machine code). Computer-readable media encompass non-transitory media such as magnetic, optic, and semiconductor storage media (e.g., hard drives, optical disks, flash memory, DRAM), as well as communication links such as conductive cables and fiber optic links. Volatile media (e.g., DRAM) retain their content only while powered, in contrast to non-volatile media (e.g., magnetic hard disk, flash memory) whose contents persist when powered down. According to some embodiments, the present invention provides, inter alia, computer systems comprising hardware (e.g., one or more processors) programmed to perform the methods described herein, as well as computer-readable media encoding instructions to perform the methods described herein.

The following description illustrates embodiments of the invention by way of example and not necessarily by way of limitation.

Figure 1:
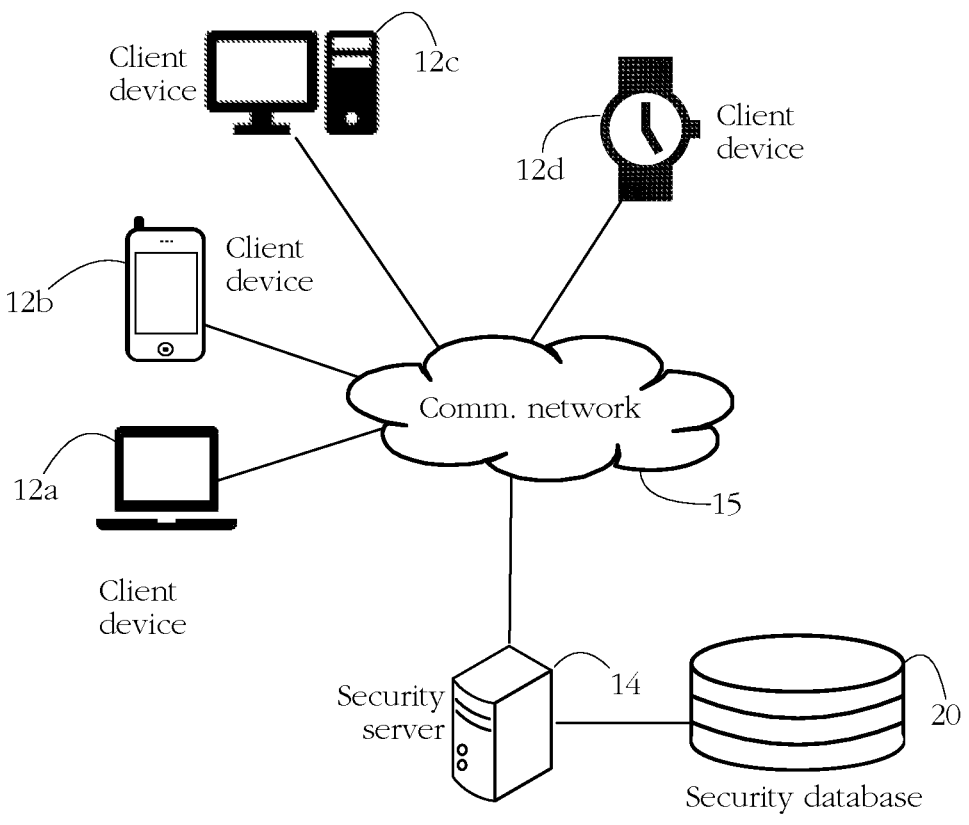
FIG. 1 shows a plurality of client devices protected from malware according to some embodiments of the present invention.

FIG. 1 shows a plurality of client devices 12a-d protected against malware according to some embodiments of the present invention. Exemplary client devices 12a-d include personal computer systems, corporate mainframe computers, mobile computing platforms (e.g., laptop computers, tablets, smartphones), entertainment devices (e.g., TVs, game consoles), wearable devices (e.g., smartwatches, fitness bands), household appliances (e.g., thermostats, refrigerators), and any other electronic device comprising a processor, a memory, and a communication interface enabling the respective device to communicate with other devices/computer systems. In some embodiments, each client device 12a-d includes a security module configured to detect malicious software. The security module may be embodied as a set of interconnected computer programs executing on at least one processor of the respective device.

Exemplary client devices 12a-d are connected to a communication network 15, which may include a local area network (e.g., home network, corporate network, etc.), a wide-area network, and/or the Internet. Network 15 generically represents a set of hardware (physical layer) and software interfaces enabling the transfer of data between devices 12a-d and other entities connected to network 15.

FIG. 1 further shows a security server 14 connected to communication network 15. Server 14 generically represents a set of communicatively coupled computer systems, which may or may not be in physical proximity to each other. In some embodiments as described below, security modules executing on each client device 12a-d may collaborate with server 14 to protect each respective device. Stated otherwise, computer security activities may be divided between a component of the respective device and server 14. For instance, sever 14 may receive entity profiles from client devices 12a-d and determine whether any of the respective profiles matches a selected profile signature, as described in more detail below. In another example, server 14 may validate a preliminary verdict of malice provided by a local instance of a computer security module executing on each respective device 12a-d, as further described below. Server 14 may protect multiple client devices 12a-d e.g. according to a service agreement/subscription, etc.

Figure 2:
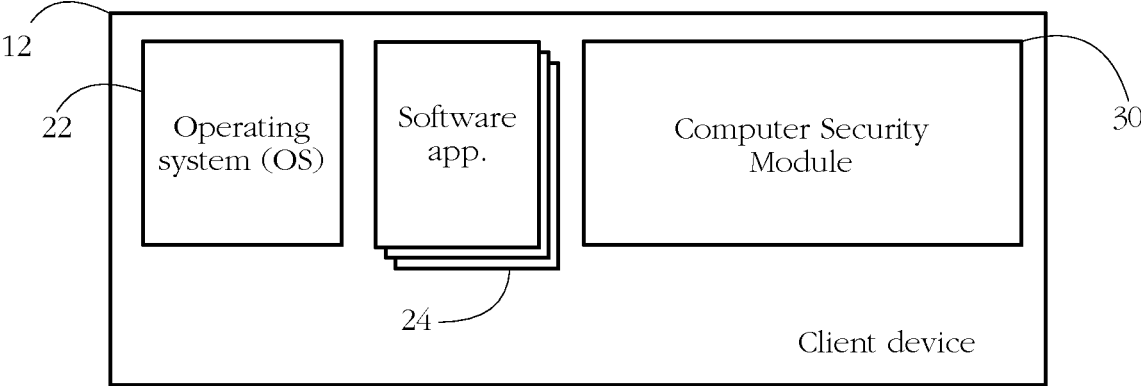
FIG. 2 illustrates exemplary software executing on a client device according to some embodiments of the present invention.

FIG. 2 shows exemplary software executing on a client device 12, which generically represents any of the client devices 12a-d in FIG. 1. An operating system (OS) 22 comprises software (i.e., computer programs) providing an interface between the hardware of client device 12 and other computer programs such as a set of software applications 24 executing on the respective device. Exemplary operating systems include, among others, Windows®, Linux®, iOS®, and Android®. Software applications 24 generically represent any computer program, such as word processing, image processing, spreadsheet, calendar, gaming, social media, web browser, and electronic communication applications, among others.

In some embodiments, a computer security module 30 protects client device 12 against computer security threats such as malicious software and intrusion. The following description will focus on exemplary embodiments wherein module 30 comprises a set of computer programs, i.e., software executing on at least one processor of client device 12. However, a skilled artisan will know that the present description may be adapted to alternative embodiments wherein module 30 is implemented in hardware or a combination of hardware and software, without affecting the scope of the present invention. Module 30 may form a part of a larger security suite also providing traffic control (e.g., firewall, parental control) and spam control services, among others.

In some embodiments, computer security module 30 is configured to monitor the behavior of a set of software entities executing on client device 12 and determine whether the respective behavior is indicative of malice. Monitoring software behavior herein comprises detecting a set of events caused by the execution of the respective software and analyzing the respective events to determine whether device 12 comprises malware. Exemplary monitored software entities include individual processes belonging to OS 22 and/or to software applications 24. A single instance of security module 30 may be configured to monitor multiple (e.g., hundreds) of target entities concurrently.

Figure 3:
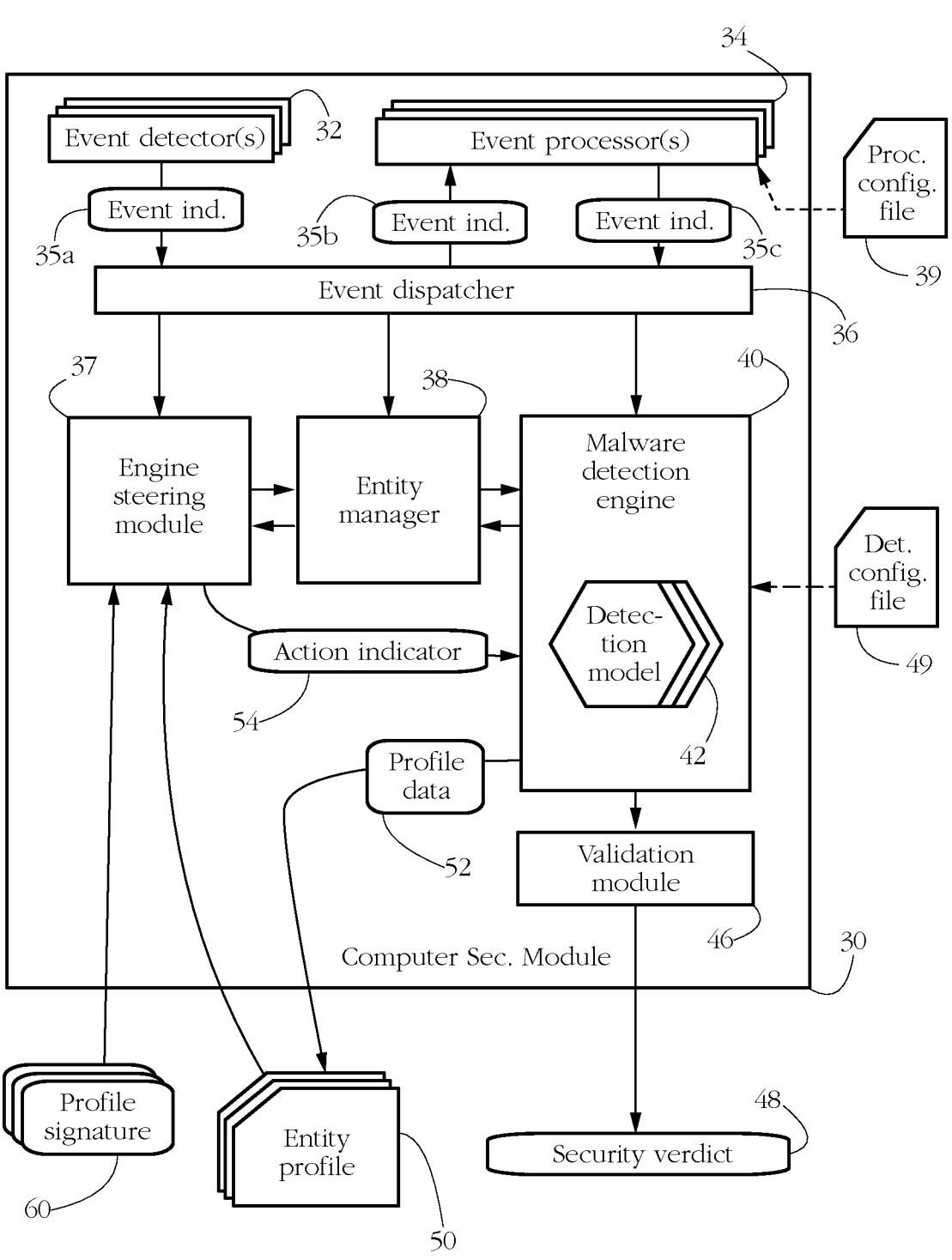
FIG. 3 shows exemplary components of a computer security module according to some embodiments of the present invention.

FIG. 3 shows exemplary components of computer security module 30 according to some embodiments of the present invention. Module 30 comprises a malware detection engine 40 configured to selectively apply a plurality of available detection models 42 to determine whether client device 12 comprises malicious software. Exemplary detection models 42 output a provisional verdict (e.g., clean/malicious) or a numerical score indicative of a likelihood that a respective target entity or group of entities is malicious. Some embodiments of detection engine 40 may then aggregate malware-indicative scores output by multiple detection models 42 and determine whether a respective entity or group of entities is malicious by comparing the resulting aggregate score to a pre-determined threshold.

Models 42 may implement any malware-detection method known in the art. For instance, models 42 may embody a set of malware-detection heuristics, i.e., sets of rules for determining whether a target software entity/group is malicious. Exemplary heuristics may determine that an entity is malicious if it carries out a particular action or sequence of actions, such as reading a file, encrypting its contents, and storing the encrypted content on disk. Other exemplary heuristics may evaluate various security predicates according to characteristics of a target entity or according to an event caused by executing a target entity. For instance, an exemplary heuristic may determine whether a path of a file accessed by a target entity coincides with the location of a Chrome® password file, etc. Distinct models 42 may correspond to distinct heuristics. In yet another example, each model 42 may comprise an artificial intelligence (AI) system such as a set of pre-trained artificial neural networks configured to receive a set of characteristic features of a target entity and to determine whether the respective entity is malicious according to said characteristics.

In some embodiments, distinct detection models 42 may apply to distinct types of monitored entities. For instance, Microsoft Word® macros may be monitored using a detection model distinct from another model used to monitor portable executables. In some embodiments, there may be multiple detection models 42 applicable to the same type of entity. However, the respective models may differ in the actual malware-detection method employed and in the associated computational cost. Some models 42 may further have adjustable parameters, such as score values and increments, detection thresholds, and flags, among others. In some embodiments, a detection configuration file 49 may store data associating detection models 42 with entity types and/or entity behavior patterns, as well as model-specific parameter values. The content of configuration file 49 may vary among client devices 12*a-d* and/or among distinct users of each respective device.

The input of some models 42 comprises current values of a set of behavioral attributes of a monitored entity/group, said attributes characterizing actions of the respective entity/group such as opening a file, changing an access permission, launching a child process, injecting code into another software entity, sending an electronic communication (e.g., an HTTP request for a remote resource), etc. Such behavior may be detected via a set of computing events caused by the execution of the respective entity(ies).

In some embodiments, computing events are detected by an event processing infrastructure comprising a set of event detectors 32, a set of event processors 34, and an event dispatcher 36 connected to event detectors 32 and event processors 34 (FIG. 3). The event processing infrastructure may comprise any implementation of a message delivery system. For instance, components 32-34-36 may register callbacks to be notified whenever a specific event occurs on client device 12, and further associate each event with a software entity causing the respective event.

Event detectors 32 comprise hardware and/or software devices configured to detect various events occurring during execution of software on client device 12. Some detectors 32 may specialize in detecting particular types or categories of events.

Exemplary detected events include application installs, uninstalls, and updates, process/application launches and terminations, the spawning of child processes (e.g., forking), dynamic loading/unloading of a library, execution of a particular processor instruction (e.g., system call), file events such as file creation, write, deletion, etc., and setting various OS parameters (e.g., Windows® registry events, permission/privilege changes), among others. Other exemplary detected events may include receiving a request to access a peripheral device (e.g., hard disk, SD card, network adapter, microphone, camera), receiving an incoming communication (e.g., a short message service-SMS message), a request to access a remote resource (e.g., a hypertext transfer protocol-HTTP request to access a particular URL, an attempt to access a document repository over a local network), a request formulated in a particular uniform resource identifier scheme (e.g., a mailto: or an ftp: request), and an attempt to send an electronic message (e.g., email, SMS, etc.), among others. Yet other exemplary events comprise moving a user interface/window of target application 24 in and/or out of focus/foreground.

Some embodiments of event detectors 32 may further detect various timing-related events, such as periods of inactivity, i.e., time gaps between events and/or time intervals when the respective client device is idle, registers no user activity, or carries out only internal system tasks. Such inactive periods may be further differentiated into short time gaps (e.g., of the order of a seconds) and long time gaps (e.g., of the order of minutes to hours). Other timing-related events may include, for instance, a sequence of events occurring in quick succession/bursts of activity.

Exemplary events specific to, or particularly relevant to the security of, mobile devices include screen toggles (on/off), a change in the label/name/icon of an application, and a screen grab. Other examples include a request to grant a specific type of permission (e.g., admin, accessibility), permissions requested dynamically (i.e., during various stages of execution, as opposed to at installation), and granting persistency (e.g., a foreground service started dynamically by the respective application). Yet other examples include an attempt to prevent an uninstall of the respective application and displaying an overlay on top of an OS settings interface (such an overlay may trick an unsuspecting user into granting the respective application unwanted permissions).

Such event detection may be device-type-specific. In one example wherein client device 12 is a personal or laptop computer, upon detecting a creation of target entity, event detectors 32 register the respective entity and/or its associated set of processes with an event logging service of OS 22 (e.g., event tracking for Windows®—ETW, Syslog in UNIX®). In response, event detectors 32 may receive notifications of various events occurring during execution of the respective processes, either in real time or in log form. Event logging tools typically generate a list of event descriptors including a timestamp for each event, a numerical code identifying an event type, an indicator of a type of process or application that generated the respective event, and other event parameters. In such embodiments, detectors 32 may detect the occurrence of a target event by parsing the respective event log.

In another example, a specialized event detector 32 may modify a set of native functions of OS 22 by inserting redirecting instructions (also known as hooks or patches). In this manner, when a process executing on client device 12 calls the respective OS function, execution is redirected to a callback routine notifying detector 32 of an attempt to execute the respective OS function. When the hooked function is instrumental in a monitored event (e.g., file creation, process launch, etc.), an attempt to call the respective function may serve as an indicator of the occurrence of the respective event.

In yet another example of event detection, electronic communications sent by the respective client device may be detected by installing a specialized event detector 32 as a proxy module configured to intercept domain name service (DNS) queries and/or HTTP requests transmitted by the client device 12.

Some operating systems such as those executing on smartphones, wearables, etc., may not allow such manipulations. However, other tools may be available to detect the occurrence of various events. For instance, some OSs expose an application programming interface (API) that enables registering callbacks for different notifications, inspecting network traffic, SMS/MMS manipulation, detecting access to storage devices (e.g., SD card), etc. Some embodiments of event detectors 32 use functions of an accessibility API to access on-screen content and detect user interactions with the respective device and/or applications.

In some embodiments, event detectors 32 notify event dispatcher 36 in response to the occurrence of a respective event, for instance by transmitting an event indicator 35a (FIG. 3). Dispatcher 36 is configured to centralize event notifications from detectors 32 and distribute or otherwise make such information accessible to other components of computer security module 30. Dispatcher 36 is further configured to maintain a mapping/association between each detected event and a target software entity causing the respective event. Data associating each event with a target entity may be provided by event detectors 32 and/or event processors 34. In some embodiments, dispatcher 36 stores and/or manages individual events as data structures containing fields/attributes that can be strings, integers, booleans, or bitmaps of flags.

In some embodiments, events may be organized on several semantic levels. Some event detectors 32 may only provide low-level, raw and/or unstructured data. In some embodiments, a set of event processors 34 is configured to analyze and/or aggregate such primary data to infer the occurrence of higher-level events. As such, event processors 34 may receive event indicators 35b via dispatcher 36 and contribute other event notifications 35c to dispatcher 36 with (FIG. 3). In one example, an event processor 34 may add attribute values/metadata to an event detected by detectors 32. For instance, when event indicator 35b communicates receiving an SMS, an exemplary event processor may determine whether the respective SMS includes a hyperlink and return such information in updated event indicator 35c. In a more sophisticated example, event processors 34 may use artificial intelligence (e.g., natural language processing, computer vision, etc.) or other means of analyzing a content displayed on screen, to determine whether the respective target entity is displaying a login form, a payment interface, an advertisement, etc. In yet another example, some event processors 34 may combine information about multiple events to determine whether an aggregate, higher-level event has occurred.

Event processors 34 may be organized in multiple layers, so that the output of one layer is further fed to event processors in another layer. Such hierarchical event processing architectures may characterize detected events efficiently and with customizable granularity and complexity. In some embodiments, distinct event processing layers may correspond to different event semantic levels. For instance, distinct processing layers may essentially respond to different questions, such as how, what, and why a target entity has performed a specific action. In one such example, the event processing infrastructure of security module 30 is configured to detect an event comprising copying a file to a Windows® startup folder. To perform such an operation, a target entity may for instance:

A. Call the CopyFile function of the Windows® API

B. Copy chunks of the respective file using a sequence of file read and write commands.

C. Use the COM object IFileOperation::CopyItem to copy the file.

Event detectors 32 may signal the occurrence of low-level events, e.g., an attempt to execute the CopyFile instruction (case A), individual file read and/or writes (case B), a COM call to IFileOperation (case C). A set of event processors 34 may consume such low-level events to determine whether they are indicative of a higher-level file copy event. For instance, in case B, some processors 34 may aggregate multiple detected read/write events and determine whether they involve chunks of the same file. When yes, the respective event processors may transmit event indicator 35c notifying event dispatcher of the occurrence of a file copy event. Another event processor 34 may then ingest the file copy event and determine whether it is indicative of an attempt to copy a file into the startup folder, and when yes, generate another event indicator notifying dispatcher 36 accordingly.

In some embodiments, to save computing resources, some event processors 34 may be selectively activated and/or de-activated, for instance according to a type of target entity being monitored. A selected processor 34 may also be de-activated for instance when no other event processor or detection model 42 currently uses its output. Some embodiments may use an event processor configuration file 39 to specify inter-dependencies between event processors 34 and/or to specify which event processors 34 should be active/inactive according to each type of target entity. Configuration file 39 may be formulated using any data specification standard known in the art, for instance in a version of extensible markup language (XML) or JavaScript® Object Notation (JSON).

The manner in which event information is dispatched to event processors 34 and/or other components of module 30 may vary among embodiments and event types. Exemplary dispatch mechanisms include, for instance, fast dispatch, synchronous dispatch, and/or asynchronous dispatch. In fast dispatch, events are submitted directly to event processors 34 without locking or extra memory allocations. An example comprises dispatching data received from a network traffic sensor registered with a Windows® filtering platform. Event processors 34 ingesting fast dispatch events are typically pre-registered with the associated event detectors, and cannot be dynamically activated or de-activated. In synchronous dispatch, the process/thread causing the respective event is suspended while events are submitted to event processors for analysis, and resumed after the conclusion of the analysis. Thread locking and extra memory allocation further allow event processors 34 to be activated/de-activated dynamically. In asynchronous dispatch, the process/thread causing the respective event is allowed to continue execution, and event notifications are added to a queue ingested by a dedicated processor thread pool. Some event processors 34 and/or detectors 32, for instance handlers of Event Tracing For Windows (ETW) data, may require asynchronous dispatch.

Figure 4:
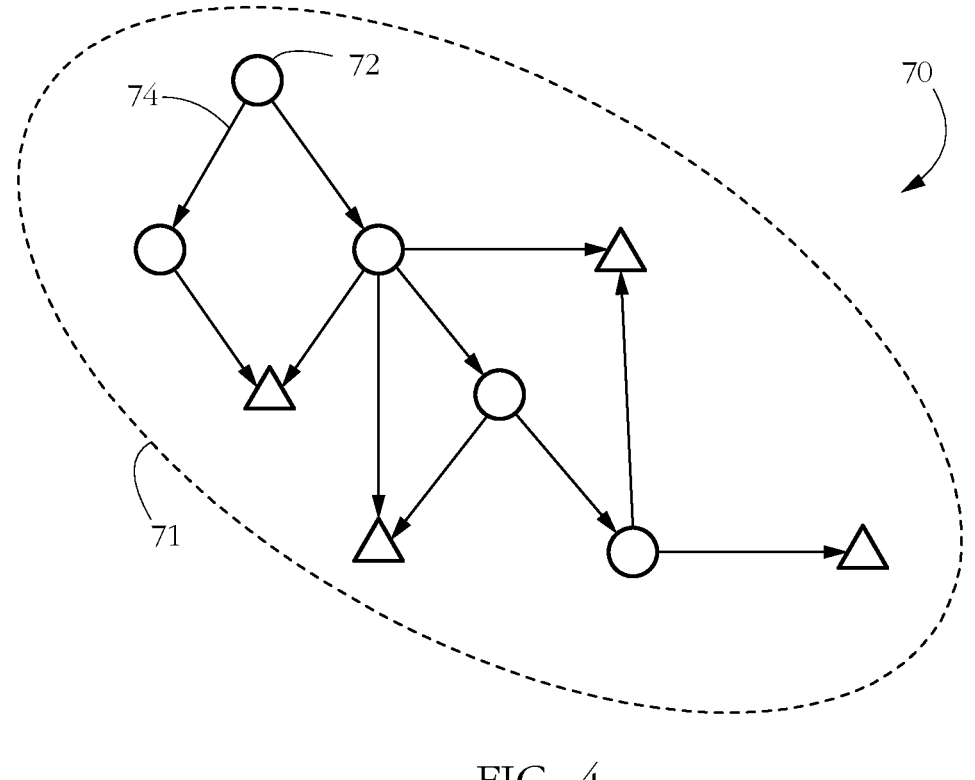
FIG. 4 illustrates a generic, exemplary entity map describing a group of inter-related entities according to some embodiments of the present invention.

In some embodiments, computer security module 30 (FIG. 3) further comprises an entity manager 38 connected to event dispatcher 36 and malware detection engine 40, manager 38 configured to construct and maintain a set of entity maps identifying and describing groups of inter-related monitored software entities. FIG. 4 shows an exemplary generic entity map 70 according to some embodiments of the present invention. Map 70 comprises a computer-readable representation of an entity group 71, map 70 including specifications of individual group members (entities 72) and of pairwise relations 74 between such entities.

Entity group 71 may include worker entities and resource entities, depicted in FIG. 4 as circles and triangles, respectively. Worker entities comprise computer programs (e.g., individual processes), which may or may not be currently executing on the respective client device. Exemplary worker entities include entities currently loaded into a volatile memory (e.g., RAM) of client device 12, as well as entities which have previously executed on device 12 and are currently terminated. In one example wherein a parent process spawns a child process and then quits, an entity group may comprise both the parent and the child processes. In contrast to worker entities, resource entities represent static assets stored on non-volatile computer-readable media (e.g., a hard disk used by client device 12), said assets called upon or otherwise accessed by at least one worker entity of the respective entity group. Exemplary resource entities include files and OS registry entries, among others. To illustrate the difference between worker and resource entities in an exemplary embodiment running on a Microsoft Windows® platform, an executing portable executable (PE) is a worker entity, while its disk image (.EXE file) is a resource entity.

Entity map 71 further comprises a set of inter-entity links 74, represented as arrows in FIG. 4. Such links/graph edges represent relations between the respective endpoint entities. In some embodiments, a relation between a couple of entities represents an action that one member of the couple performs on the other. Directional links/edges shown as arrows in FIG. 4 indicate a direction of a respective action, e.g., which entity performs the respective action. Some embodiments distinguish between multiple relation types. Exemplary relations between worker entities include, among others, filiation (a parent entity creates a child entity via spawning, forking, etc.), code injection (i.e., one process writes data into a region of memory currently used by another process), an action wherein one entity reads a content of a memory belonging or used by the other entity, an action wherein one entity enumerates objects (e.g., libraries) loaded by the other entity, an action wherein one entity suspends execution of the other entity, and an action wherein one entity kills/terminates the other entity. Exemplary relations between a worker entity and a resource entity include write/set, modify, read, load, execute, and delete, among others.

A worker entity may be related to a resource entity also because of an action of its parent entity. Some examples occurring on a Windows® platform are given below. In one such example, a parent process first registers a service by setting a specific OS registry key (resource entity). The parent and then instructs the service manager to start said service, thus spawning a child entity. The child may be configured to start automatically after a reboot or may be explicitly started via a service manager API.

In another example, a parent process registers a child process as a task, by using the task scheduler API or by simply writing a task configuration file (resource entity). The parent then instructs the task scheduler to start the child. The child entity may be configured to start at a specific time or to start automatically following a reboot.

In yet another example, a parent entity may cause a debugger service to automatically start a child entity in response to a creation of an arbitrary process, by setting a particular OS registry key (resource entity). Yet other examples may use a Windows Management Instrumentation (WMI) event notification facility. A parent process may register an event consumer and a filter with the WMI by way of a script file (resource entity), thus causing the WMI engine to automatically start a child entity in response to an occurrence of some type of event.

All of the process creation mechanisms described above may be manipulated for malicious purposes, for instance for privilege escalation or masking the source of an attack. It may therefore be instructive from the viewpoint of computer security not only to associate the parent and child entities, but also to associate the child entity with a resource entity that mediated the creation of the respective child. For instance, when a parent entity reads writes a selected resource entity (registry key, script file, configuration file, etc.) before creating a child entity, some embodiments may connect the respective resource entity to both the parent and the child entities within the respective entity map.

Constructing entity map 70 goes beyond the scope of the present description. Embodiments of the present invention may use any criterion known in the art for adding, annotating, and/or removing an entity from entity group 71, as well as for establishing and specifying inter-entity relations 74. Entity maps 70 may be stored in a volatile memory, or in map repository stored on non-volatile media used by the respective client device 12. The data format entity map 70 may also vary among embodiments. Examples include a profile of a relational database and a set of attribute-value pairs expressed in a version of extensible markup language (XML) or Javascript® Object Notation (JSON), among others. Some embodiments of entity manager 38 maintain an association between each entity map 70 and its member entities 72, which enables a selective retrieval of entity maps according to the identity and/or characteristics of a member.

In some embodiments, detection engine 40 monitors multiple entities and/or entity groups via a system of malware-indicative scores which are dynamically updated according to the behavior of the respective monitored software. A decision on whether the respective client device comprises malware may then be taken by comparing a malware-indicative score to a pre-determined threshold. Threshold values may vary according to user preference, device type, security policy, subscription, or service-level agreement, among others.

In one exemplary embodiment, a first set of scores comprises individual entity scores, each entity score associated with an individual worker entity currently or previously executing on the respective client and indicative of whether the respective entity is malicious. A second set of scores may comprise collective group scores, each such group score associated with an entity group identified by entity manager 38 and indicative of whether the respective whole group of entities is malicious. An exemplary group score comprises a sum of the current scores of its individual member entities. Since group scores may change according to an action of an individual member, such scores facilitate detection of sophisticated malware wherein malicious activities are divided among group members. Some embodiments uniquely associate each group score with an entity map identifying a respective group of inter-related entities as described above. To accurately manage entity and group scores, detection engine 40 may receive information such as current group composition from entity manager 38 (see FIG. 3).

In some embodiments, each malware detection model 42 may be selectively triggered by a particular type of event. Therefore, entity and/or group-specific scores may be dynamically updated during a lifetime of the respective entity/group according to the output of various detection models 42, as the respective monitored entity performs various activities. A monitoring procedure according to such embodiments may thus comprise detecting events caused by the respective target entity, and in response, identifying and applying models 42 associated with the respective type of event. The identified models 42 then produce model-specific scores which in turn increment entity- and/or group specific aggregate scores. Such monitoring procedures are further detailed below in relation to FIGS. 7-A-B-C.

Scores produced by selected detection models 42 may vary according to selected characteristics of the respective entity/group. For instance, the action of accessing a user file may produce one score increment if the respective worker entity comprises verified code, and another, relatively larger score increment otherwise. One consequence of such variability is that scores produced by the same detection model 42 may vary during the lifetime of a monitored entity, as some characteristics of the respective entity change in time. Using the example above, the output of said detection model may change in response to the respective entity's receiving injected code (and therefore no longer being considered as having verified code).

Some embodiments of malware detection engine 40 are dynamically re-configurable, in the sense that a monitoring procedure for monitoring a target software entity is changeable. For instance, each monitored entity may be associated with a selected subset of currently active detection models 42. In such embodiments, only models 42 that are currently active may be used in monitoring the respective entity/group. Stated otherwise, only models 42 that are currently active may be triggered by events caused by the execution of the respective entity/group. However, the selection of active models assigned to each entity/group may change in time, e.g., in response to notifications from steering module 37, as described in more detail below. An association between monitored entities and currently active models 42 may be implemented for instance using an entity-specific bitmap wherein each bit represents a distinct model 42 and a value of the respective bit indicates whether the respective model is currently active. Models 42 may then be activated and/or de-activated at any time by setting the respective bits. To give a simple example of dynamic engine re-configuration, detection engine 40 may start monitoring a target entity/group using a relatively simple set of heuristics (i.e., an initial detection model 42), and later switch to using a more computationally expensive set of heuristics (i.e., another detection model 42) in response to an output of the initial model indicating a suspicion of malice, or in response to a profile signature match as described below. Another exemplary re-configuration of engine 40 comprises de-activating a set of currently active heuristics in response to a false positive verdict of malice.

In an alternative example of engine re-configuration, a detection model 42 currently used in monitoring a target entity may have an adjustable parameter (e.g., a value of a malware-indicative score output by model 42 for a particular input). To re-configure engine 40, the respective parameter may be adjusted in response to a signature match or in response to changes in selected characteristics of the respective target entity. Following such parameter adjustment, the respective detection model may output another value when presented with the same input. Such a re-configuration mechanism may be used, for instance, to change a relative weight of a set of malware-detection heuristics at various points during a lifetime of a monitored software entity.

In some embodiments, computer security module 30 further comprises an engine steering module 37 communicatively coupled to malware detection engine 40 and entity manager 38 and configured to determine whether an entity profile 50 of a target software entity matches any of a set of pre-determined profile signatures 60, as described in detail below. In response to a signature match, some embodiments of steering module 37 may re-configure engine 40 to alter a procedure of monitoring the respective target entity.

Entity profile 50 comprises a set of attribute values characterizing a selected entity 72 and/or entity group 71. Profile 50 may include values of any security-relevant attributes know in the art. Some attributes may be static, i.e., characterizing non-behavioral features such as a location (e.g., file path), a size, or a type of an executable entity. Other attributes may be behavioral, e.g., for instance indicating whether a respective entity has performed a specific action, whether the actions of the respective entity have triggered a specific heuristic, etc. Other exemplary entity/group attributes may include timestamps associated with various lifecycle events such as process launches, terminations, and the spawning of child entities, and various security flags indicating for instance whether a respective worker entity is executing code from a source external to the respective client device, or whether a content of a respective resource entity has changed since its addition to the respective entity group. Other exemplary entity attributes included in entity profile 50 comprise various contents of an entity map, such as an identifier of another entity and a type or relation connecting the other entity to the current one (e.g., filiation, code injection, read/write, etc.).

Yet other exemplary contents of entity profile 50 include various parameter values used by malware detection engine 40 in monitoring the respective entity and/or entity group. For instance, entity profile 50 may include identifiers of currently active detection models 42 (e.g., current heuristics used in monitoring) and current parameter values of the respective models (e.g., model-specific scores, exceptions, etc.). Entity profile 50 may further include indicators of a current state of the respective client device 12, such as values of various OS registry keys and/or other settings, details of a hardware configuration of device 12, and a software profile (e.g., list of applications 24 currently installed on device 12), among others.

An exemplary embodiment of profile 50 may include a plurality of attribute-value pairs or tuples expressed in any data format or specification known in the art, such as a Javascript® object notation (JSON) and a version of an extensible markup language (XML). In preferred embodiments, the encoding and format of entity profile 50 is chosen to enable a selective retrieval of an attribute value according to an identifier of the respective attribute. Profile 50 may be stored in the form of a computer file on non-volatile computer-readable media (e.g., flash memory) of a storage device used by the respective client device. Preferred embodiments store entity profiles 50 as text files, the advantages of which include readability and relatively small filesize. In some embodiments, engine steering module 37 may collaborate with entity manager 38 to establish a mapping between entities, entity groups, and entity profiles 50, enabling a selective identification of an entity profile corresponding to a specific entity or entity group.

In some embodiments, entity profiles 50 are generated and/or updated dynamically, for instance in response to a trigger event such as a specific action performed by a currently monitored entity. Depending on embodiment, profiles 50 may be created by malware detection engine 40 and/or engine steering module 37. In one example illustrated in FIG. 3, engine steering module 37 may be notified by dispatcher 36 about the occurrence of a profiling trigger event. In response, engine steering module 37 may instruct detection engine 40 by way of an action indicator 54 to create entity profile 50. Detection engine 40 may then write profile data 52 (e.g., a set of attribute-value pairs characterizing a respective entity and/or group) to a text file storing the respective profile 50. In an alternative embodiment, malware engine 40 may create or update profile 50 independently of steering module 37.

Exemplary profiling trigger events include various actions performed by a respective software entity. Typical examples include actions which are particularly informative about computer security, such as highly malware-indicative actions (e.g. sequences of actions performed by ransomware, detection evading maneuvers, actions directed at establishing a persistent footprint on the local machine, etc.), code injections, spawning of child processes, process startup and/or initialization actions, etc. Other exemplary profiling triggers include detecting a change in a selected characteristic of the respective software entity. Other exemplary profiling triggers include changes in an entity map and/or entity group including the respective software entity. Yet other examples of profiling triggers include execution of a selected malware detection model 42 and a preliminary verdict of malice, e.g., a determination that a malware-indicative score exceeds a selected threshold. Other exemplary profiling trigger events comprise receiving a notification from another component of a computer security software suite (e.g., a firewall), and receiving a notification from security server 14 (e.g., see description below related to FIG. 8).

In some embodiments, entity profiles 50 are stored persistently. In one such example, module 30 stores multiple entity profiles/files 50, each profile associated with a distinct entity 72 and/or group 71. Each such entity profile may be updated multiple times, e.g., at various stages during a lifetime of the associated entities. In such embodiments, the entity profile may retain the history of the respective entity through multiple life stages. Furthermore, the same entity profile 50 may be used multiple times for signature matching. However, distinct signature attempts on the same profile/file may produce distinct results since the contents of the respective profile/file potentially change in time. In alternative embodiments featuring non-persistent storage, a new entity profile 50 is generated on-the-fly every time a profiling trigger event occurs, and deleted following a signature matching procedure.

In some embodiments, engine steering module 37 is configured to attempt to match entity profile 50 to a set of profile signatures. Profile signatures are pre-determined and may be formulated by a computer security specialist and/or generated automatically. In some embodiments, a collection of profile signatures 60 is assembled at security server 14 and transmitted to client devices 12a-d, for instance as an automatic or on-demand software update. In alternative embodiments, signatures 60 may be stored on security server 14 and selectively fetched on-demand by engine steering module 37, for instance according to a type of trigger event, to a type of entity/group, and/or according to other criteria. In yet other exemplary embodiments detailed below, a telemetry engine executes on security server 14 and performs signature matching on entity profiles 50 received from client devices 12a-d.

An exemplary profile signature 60 is illustrated in FIG. 5. A skilled artisan will know that the illustrated content and format of signature 60 are given only as an example and not meant to be limiting. For instance, although the exemplary signature 60 is expressed in JSON code, alternative embodiments may use a different language/data format such as a version of XML, among others.

Signature 60 comprises encodings of a set of match predicates 62a-b and a set of on-match action indicators 64a-c. Each match predicate 62a-b may evaluate to either TRUE or FALSE according to the content of entity profile 50. In some embodiments, a profile signature is said to match an entity profile if and only if all match predicates of the respective signature evaluate to TRUE. Alternative embodiments may allow partial or fuzzy matches, for instance, determine that a signature matches an entity profile when at least 80% of the predicates recited in the respective profile signature evaluate to TRUE.

An exemplary match predicate comprises a condition formulated according to a specific attribute identified within entity profile 50. The respective condition may depend on the data type of the respective attribute. For attributes of type string, exemplary conditions include an exact match and a regular expression, among others. In FIG. 5, exemplary predicate 62a comprises determining whether the file description of a Process Info data object contains the substring 'updater'. For attributes of a numerical type, exemplary conditions include comparing the respective value to a reference, e.g., FileSize>=0x20000. For attributes of type flag, exemplary conditions may check whether a specific flag is set or not, e.g., ProcessInfo.ProcessFlags IsSet (5), wherein 5 denotes a specific index within an array of flags. For more complex attributes, the match predicates may include an array of conditions. In FIG. 5, exemplary predicate 62b shows multiple conditions applied to individual fields of a complex data structure of the 'Heuristics' type.

On-match action indicators 64a-c encode actions performed by malware detection engine 40, entity manager 38, and/or engine steering module 37 in response to a match of the respective signature. One exemplary on-match action comprises determining that an entity or group associated with the respective entity profile 50 comprises malware. Another exemplary on-match action comprises setting/resetting various security flags characterizing a respective entity/group. Yet other exemplary on-match actions include modifying an entity map of a respective entity/group, for instance to add a new entity to an existing entity group, remove an entity from a group, add a new connection or remove an existing connection between two entities, etc.

Some on-match actions cause a re-configuration of malware detection engine 40, thereby altering a current entity monitoring procedure. Said engine re-configuration may comprise changing the current selection of active detection models 42, e.g., by activating a previously inactive model and/or de-activating a currently active one. One such exemplary re-configuration comprises activating additional heuristics in response to a profile signature match, or in response to a preliminary verdict of malice. Another exemplary re-configuration comprises switching from a relatively simple heuristic to another, more computationally expensive heuristic in response to a signature match. Yet another exemplary re-configuration of engine 40 comprises switching from an initial set of models 42 applicable to all types of malware to another set of models 42 directed at a specific malware type or family. In the profile signature illustrated in FIG. 5, exemplary on-match action indicator 64a activates a heuristic identified as ATC_Heur_4, while exemplary on-match action indicator 64c marks a whole set of currently active heuristics for de-activation.

Re-configuring engine 40 may also include adjusting a parameter of a currently active detection model 42. Exemplary adjustable parameters of engine 40 include a value of a malware-indicative score produced by a specific detection model in response to a specific input. In one such example wherein malware detection engine 40 combines individual scores from a plurality of heuristics into a single aggregate score, reconfiguring engine 40 may comprise changing a relative contribution of each of the respective heuristics to the aggregate score. In the exemplary profile signature 60 illustrated in FIG. 5, on-match action indicator 64b sets a 'MalwareFamily' parameter of engine 40, while on-match action indicator 64a sets multiple parameters of a heuristic identified by the name ATC_Heur_4.

Yet another exemplary on-match action comprises increasing a malware-indicative score of the respective entity/group by a specified amount, and associating the respective score increase with the respective profile signature 60. Such actions mimic the triggering of a detection model/heuristic by providing a score increase, but the respective score increase comes from outside of malware detection engine 40. On-match actions of this kind may be used to test the usefulness of new heuristics and models, for future integration into the detection engine itself. In one such example, a new set of predicates may be implemented as a profile signature and tested on real samples. The performance of the new predicates is then evaluated over a corpus of data. Predicates that are found to improve detection performance by increasing detection rate and/or lowering a false positive rate may then be incorporated into existing detection models 42.

Figure 6:
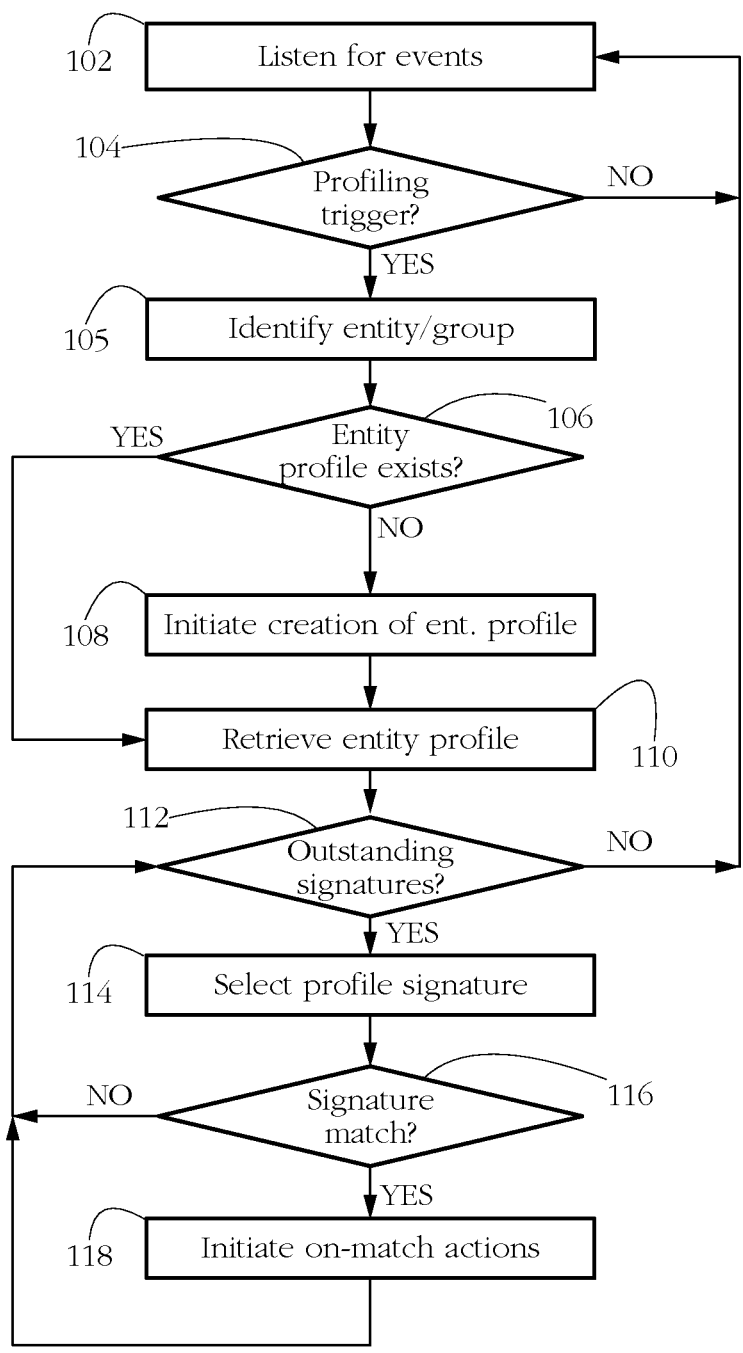
FIG. 6 shows an exemplary sequence of steps performed by an engine steering module according to some embodiments of the present invention.

FIG. 6 shows an exemplary sequence of steps performed by engine steering module 37 according to some embodiments of the present invention. A sequence of steps 102-104 listens for event notifications from event dispatcher 36. Some events herein deemed profiling triggers cause engine steering module to carry out a signature matching procedure. Some examples are discussed above.

In response to a profiling trigger event, a step 105 may identify an entity and/or an entity group causing the respective trigger event. Step 105 may comprise accessing current entity maps 70 managed by entity manager 38. A further step 106 may determine whether any entity profiles 50 exist for the identified entity/group. When no, in a step 108 engine steering module 37 may initiate the creation of an entity profile, for instance by transmitting an action indicator 54 to malware detection engine 40, instructing detection engine 40 to create the respective entity profile. Action indicator 54 may include an identifier of the respective entity/group, enabling malware detection engine 54 to create an entity- or group-specific entity profile. A step 110 may then identify and retrieve the respective entity profile, for instance according to its filename.

Engine steering module 37 may then repeat a loop of steps 112-114-116 for a collection of pre-determined profile signatures 60. A step 114 may select a signature from a signature repository. Signature selection may be carried out according to specific criteria, for instance according to a type of entity or group associated with the respective entity profile, according to a type or family of malware, etc. A step 116 may then check whether the selected signature matches the respective entity profile. Step 116 may comprise evaluating match predicates of the respective profile signature using attribute values specified in the respective entity profile, and determining whether there is a match according to a result of predicate evaluation. (See exemplary telemetry predicates 62a-b and associated description above.) When the selected signature matches the entity profile, a step 118 may initiate on-match actions specified in the respective profile signature. (See exemplary on-match action indicators 64a-c and associated description above.) Step 118 may include transmitting action indicator(s) 54 to malware detection engine 40 instructing engine 40 to re-configure a current selection of detection models 42, adjust various detection parameters, etc. When all available profile signatures 60 have been checked for a match, engine steering module 37 may return to listening for profiling trigger events. Some embodiments erase the current entity profile at the end of the signature matching procedures.

In some embodiments as illustrated in FIG. 6, a signature matching procedure may be performed repeatedly for the same target entity or entity group, in response to different profiling trigger events. However, the result of the signature matching procedure may change in time, since the content of the respective entity profile 50 also changes as some characteristics of the respective entities/groups change during their lifetime.

FIGS. 7-A-B-C show exemplary sequences of steps performed by malware detection engine 40 in some embodiments of the present invention. In embodiments as illustrated in FIG. 3, detection engine 40 receives input from event dispatcher 36, engine steering module 37 and entity manager 38, among others. When the input comprises an event notification from dispatcher 36 (a step 214 returns a YES), in a step 216 engine 40 may identify an entity causing the respective event. Step 216 may further comprise looking up an entity map maintained by entity manager 38 to identify at least one entity group that include the identified entity.

In a further step 218, engine 40 may identify detection models 42 currently active for the entity and/or entity group(s) identified in step 216. In embodiments wherein models 42 are selectively triggered according to event type, step 218 may include identifying a model 42 according to a type of the current event and further determining whether the respective model 42 is currently active. A further step 220 may apply the identified active detection model(s) 42, for instance evaluating a set of heuristics/rules, calculating a set of inputs, feeding them to an artificial neural network and carrying out the respective neural calculations, etc. In some embodiments, the output of each model 42 comprises a score and/or a score increment determined according to the currently notified event. In such cases, step 220 may further include updating malware-indicative scores of the entity and/or entity group(s) identified in step 216.

A further step 222 may determine whether the current scores assigned to the respective entity and/or group(s) indicate that the client device comprises malware, for instance by comparing each of the respective scores to a threshold. In some embodiments, the respective client is deemed malicious/infected when at least one malware-indicative score exceeds a respective threshold. When step 222 returns a YES, some embodiments transmit a preliminary security verdict to a validation module 46 (FIG. 3). In turn, module 46 may carry out additional assessments, which may include communicating the verdict and/or other security-relevant data to security server 14. Validation module 46 may then output a consolidated security verdict 48 indicating whether the respective client device is malicious. Verdict 48 may be displayed or otherwise communicated to a user, system administrator, etc. In some embodiments, a preliminary verdict may act as a profiling trigger, causing module 37 to carry out a new profile signature matching procedure.

When the current input is not an event notification (step 214 returns a NO), a step 226 determines whether the respective input comprises a notification from entity manager 38. When YES, malware detection engine may advance to an exemplary sequence of steps illustrated in FIG. 7-B. In the current notification communicates a change in the composition of an entity group, e.g., by addition of a new entity, removal of a terminated entity, merge of two entity groups, addition of a new link, etc., (a step 232) returns a YES, in a step 234 engine 40 may update its internal entity and/or group monitoring data structures to reflect the changes. For instance, when the current notification signals a merge of two entity groups, step 234 may create a new group score associated with the new entity group, etc. In another example, when the current notification signals an addition of a new entity to an existing group, step 234 may comprise increasing a group score associated with the respective entity group by an amount determined according to a current entity score of the newly added entity.

In a further step 236, some embodiments of detection engine 40 may create or update an entity profile 50 associated with the respective entity(ies) and/or entity group(s) to reflect changes in group composition and/or entity specifications. In some embodiments, step 236 may trigger a signature matching procedure by effecting changes to at least one entity profile.

When the current notification signals a change in the specification of an entity/group, i.e., when the composition of an entity map stays the same, but some other character-istic of an entity/group has changed (a step 238 returns a YES), some embodiments may advance to step 236 described above. Engine 40 may then advance to step 216 in FIG. 7-A.

When malware detection engine 40 receives input from engine steering module 37 (a step 228 in FIG. 7-A returns a YES), a step 252 in FIG. 7-C determines whether the respective action indicator instructs engine 40 to create or update an entity profile. If yes, in a step 254 engine 40 may identify an entity and/or entity group according to action indicator 54, formulate an entity profile 50 for the respective entity/group and save profile 50 to a local storage device. Step 254 may comprise, for instance, writing a set of profile data 52 to a local text file. Exemplary profile data 52 comprises a set of attribute-value pairs characterizing a behavior of a respective entity or entity group. In addition to creating entity profile 50, some embodiments create a mapping between the newly created entity profile and the respective entity/group, enabling components of module 30 to selectively associate entity profiles 50 with their respective entities and/or groups.

If action indicator 54 includes instructions for reconfiguring detection engine 40 (i.e., if step 252 returns NO and a step 256 returns YES), a step 258 may reconfigure engine 40 according to action indicator 54. Such re-configuration may include changing a current selection of detection models 42, for instance by adding and/or removing a selected set of heuristics. Another exemplary re-configuration may include changing a current value of an adjustable parameter of a detection model/heuristic, e.g., a value of a malware-indicative score returned by the respective model/heuristic, a value of a security flag characterizing a respective entity/group, etc. In one such example, action indicator 54 comprises a parameter value indicative of a family/category of malware (see e.g., action indicator 64b in FIG. 5). Receiving such a notification may cause malware detection engine 40 to switch to a monitoring procedure and/or a set of models suited to the respective family/category of malware.

The description above focused on using entity profiles 50 and signature matching at the client. Additionally or alternatively, some embodiments may carry out signature matching procedures remotely, for instance on security server 14. FIG. 8 illustrates such an embodiment, wherein a server-side telemetry engine 67 receives entity profile(s) 50 from client (s) 12, the respective entity profiles generated for instance in response to a profiling trigger event as described above. Entity profile 50 may include an identifier of the respective client device 12 and an identifier of an entity and/or group of entities executing on the respective client and having the respective profile. In response to receiving profile 50, telemetry engine 67 may perform a signature matching procedure as described above, to determine whether the respective entity profile 50 matches a profile signature 60. Signatures 60 may be stored in and selectively retrieved from a security database 20 communicatively coupled to server 14.

Server-side signature matching may serve various purposes, for instance to complement client-side malware scanning. In one example illustrated in FIG. 8, malware detection engine 40 executing on client device 12 may determine a provisional verdict 58 indicating whether device 12 comprises malicious software. If there is a suspicion of malware, validation module 46 (FIG. 3) may initiate creation of entity profile 50 characterizing the suspect software entity and/or entity group. Module 46 may then transmit entity profile 50 to security server 14. In turn, telemetry engine 67 may carry out a signature matching procedure using a set of signatures 60. In some embodiments, on-match action indicators included in the respective signatures may confirm a provisional verdict of malice. In other words, a signature match may indicate a that the respective target entity is indeed malicious, while a failure to match may reverse provisional verdict 58. Telemetry engine 67 may formulate revised security verdict 48 according to a result of the signature matching procedure and return verdict 48 to the respective client device 12. When signature matching reverses provisional verdict 58 (e.g., in a situation of a false positive detection) telemetry engine 67 may further transmit to the respective client an action indicator causing a re-configuration of engine 40, for instance to de-activate a specific set of heuristics. Such an action indicator may be bundled with consolidated security verdict 48.

Server-side signature matching may also serve research and/or product development purposes. Telemetry engine 67 may match entity profiles 50 received from clients against profile signatures 60. In response, engine 67 may output a malware profile 66 including various characteristics of a malware agent infecting the respective client, such as a malware category, family, variant, or wave that the respective agent belongs to, a list of signatures 60 matching the respective entity profile, and/or selected attributes of a target entity extracted from entity profile 50. Malware profile 66 may then be used as a reference for developing malware detection models 42.

In yet another example illustrated in FIG. 9, engine steering module 37 executing on client 12 performs a signature matching procedure, and dynamically re-configures a local instance of malware detection engine 40, as described above. Client device 12 may then send an entity profile 50 of a target software entity/group and a provisional security verdict 58 determined by engine 40 for the respective target entity/group to security server 14. In some embodiments, verdict 58 includes an identifier of a profile signature 60 that matched profile 50. In response to receiving multiple provisional verdicts 58 determined for the same target entity/group, telemetry engine 67 may reconstitute a history of monitoring the respective target entity/group, and therefore determine how each profile signature match (and subsequent re-configuration of malware detection engine 40) affects malware detection. By analyzing verdicts 58 in conjunction with profile signatures 60 that caused engine 40 to generate the respective verdicts, security operators may gather valuable information about which match predicates work and why. Multiple match predicates may be evaluated according to their performance in discerning between malicious and benign samples, for instance using statistical and/or artificial intelligence (AI) tools. Predicates that meet specific performance criteria may then be incorporated into new or existing malware detection models 42 for use by client-side instances of detection engine 40.

FIG. 10 shows an exemplary hardware configuration of a computer system 80 programmed to execute some of the methods described herein. Computer system 80 generically represents any client device 12*a-d* in FIG. 1, as well as security server 14. Without loss of generality, the illustrated appliance is a personal computer. Other devices such as server computers, mobile telephones, tablet computers, and wearables may have slightly different configurations.

Processor(s) 82 comprise a physical device (e.g. microprocessor, multi-core integrated circuit formed on a semiconductor substrate) configured to execute computational and/or logical operations with a set of signals and/or data. Such signals or data may be encoded and delivered to processor(s) 82 in the form of processor instructions, e.g., machine code.

Memory unit 84 may comprise volatile computer-readable media (e.g. dynamic random-access memory-DRAM) storing data/signals/instruction encodings accessed or generated by processor(s) 82 in the course of carrying out operations. Input devices 86 may include computer keyboards, mice, and microphones, among others, including the respective hardware interfaces and/or adapters allowing a user to introduce data and/or instructions into computer system 80. Output devices 88 may include display devices such as monitors and speakers among others, as well as hardware interfaces/adapters such as graphic cards, enabling the respective computing appliance to communicate data to a user. In some embodiments, input and output devices 86-88 share a common piece of hardware (e.g., a touch screen). Storage devices 92 include computer-readable media enabling the non-volatile storage, reading, and writing of software instructions and/or data. Exemplary storage devices include magnetic and optical disks and flash memory devices, as well as removable media such as CD and/or DVD disks and drives. Network adapter(s) 94 enable computer system 80 to connect to an electronic communication network (e.g, network 15 in FIG. 1) and/or to other devices/computer systems.

Controller hub 90 generically represents the plurality of system, peripheral, and/or chipset buses, and/or all other circuitry enabling the communication between processor(s) 82 and the rest of the hardware components of computer system 80. For instance, controller hub 90 may comprise a memory controller, an input/output (I/O) controller, and an interrupt controller. Depending on hardware manufacturer, some such controllers may be incorporated into a single integrated circuit, and/or may be integrated with processor(s) 82. In another example, controller hub 90 may comprise a northbridge connecting processor 82 to memory 84, and/or a southbridge connecting processor 82 to devices 86, 88, 92, and 94.

The exemplary systems and methods described above enable an efficient detection of malicious software and further facilitate keeping security software up to date with rapidly emerging threats. Modern computer security software typically relies on analyzing the behavior of computer programs and classifies such behavior as either malicious or benign according to various algorithms, heuristics, etc. Software behavior is usually captured by detecting various computing events caused by the execution of the respective software. The captured events are then analyzed using a variety of tools, from simple heuristics to advanced artificial intelligence technologies.

Computer security software places a relatively high computational load on the host machine, potentially affecting user experience and productivity. Some such software therefore strives to find an optimal trade-off between malware detection performance and computational cost. Security software also needs to keep up with a rapidly evolving threat landscape, wherein new agents and variants emerge on a time scale of a few hours or days. This problem is typically solved by distributing software updates to clients. However, quickly responding to a new threat presents substantial technical challenges. Developing an update typically comprises detecting and analyzing a new malicious software agent, creating or adapting a detection routine for the new agent, testing the new detection routine, compiling versions of a software update for all client hardware and software platforms, and distributing the respective software update to clients. By the time the updates reach the end clients, the respective malicious agent may have already mutated or no longer be in use.

To address such technical challenges, some embodiments of the present invention pair a malware detection engine with an engine steering module. The malware detection engine is configured to apply a configurable selection of detection models (e.g., heuristics) to monitor software executing on the respective machine. The selection of models is configurable to achieve an optimum between detection performance and computational cost. For instance, the malware detection engine may start monitoring a software entity using relatively simple heuristics, and switch to more sophisticated detection models only if the monitored entity displays some suspicious behavior. The switch may be caused by the engine steering module in response to a profile signature match as described herein.

In some embodiments, the engine steering module is configured to initiate and/or create an entity profile of the monitored entity in response to a trigger event. The entity profile may be seen intuitively as a timely snapshot of the respective software entity, in the form of a set of current values of various attributes characterizing a current state and/or a behavior of the respective entity. An exemplary entity profile comprises a text file listing a set of attribute-value pairs formulated in JSON or a version of XML.

The engine steering module is further configured to check whether the entity profile matches any of a collection of pre-defined profile signatures. Such signatures may be formulated by a security researcher and delivered to clients in the form of computer files forming part of a software update. In some embodiments, a profile signature comprises a set of predicates involving attributes used for characterizing the target entity. Checking whether the entity profile matches the respective signature comprises evaluating signature predicates (see exemplary items 62a-b in FIG. 5) according to actual attribute values listed in the entity profile. A signature match may require that all predicates of the respective signature evaluate to TRUE.

In some embodiments, a profile signature further includes a set of action indicators (see exemplary items 64a-c in FIG. 5), indicating actions to be performed if the respective signature matches the current entity profile. Exemplary actions comprise, among others, determining that the respective client computer is infected with malware, and re-configuring the malware detection engine causing a change in a monitoring procedure. For instance, re-configuring the malware detection engine may cause the engine to switch from using one detection model (e.g., a set of heuristics) to another detection model (e.g., another set of heuristics). In another example, re-configuring the malware detection engine comprises adjusting a parameter of a malware detection model, such as a value of a malware-indicative score produced by the respective model in response to a specific input.

Pairing a functional malware detection engine with an engine steering module as described herein may have multiple advantages over conventional malware detection systems. First, a dynamically re-configurable engine is able to continuously adapt to the software environment of the host and thus operate in a highly efficient manner. Second, having the engine re-configurable from outside enables a considerable degree of flexibility for malware detection. Malware detection heuristics may be activated and/or de-activated according to current features of the monitored entity, without having to effect changes to the malware detection engine itself. Additional heuristics may be implemented on-the-fly via profile signatures.

Such advantages are especially important from the perspective of software development. Models and methods implemented in a detection engine are typically streamlined, optimized, and pre-compiled into binaries to ensure an efficient use of computational resources. In a conventional software development paradigm, any change to an existing malware detection procedure may therefore require substantial offline testing, coding the respective changes into the existing version of the detection engine, compiling multiple platform-specific versions of the updated binaries, and distributing the respective updates to client devices.

In contrast to such conventional approaches, some embodiments of the present invention use profile signatures to enhance the functionality of an existing malware detection engine, without updating the software of the engine itself. New detection heuristics may be quickly implemented as profile signatures that invoke the already available, tested, and stable detection engine. New heuristics may be delivered to clients as plain text files, which are orders of magnitude smaller than engine binaries and take a fraction of the time to develop. The detection performance of the new heuristics may be tested online, for instance using telemetry as described above. This allows for an unusually fast response to new malware variants and attack waves. Following testing, only the heuristics that meet certain performance criteria may go on to be included in subsequent updates of the detection engine itself. Some heuristics associated with specific short-lived malware waves may never end up as binaries at all, based on the observation that once the respective wave has passed, the probability of encountering the respective malware version is relatively small. The respective heuristics may still be kept as profile signatures and/or used in forensics or malware research.

It will be clear to one skilled in the art that the above embodiments may be altered in many ways without departing from the scope of the invention. Accordingly, the scope of the invention should be determined by the following claims and their legal equivalents.

The invention claimed is:

1. A computer system comprising at least one hardware processor configured to execute a malware detection engine and an engine steering module connected to the malware detection engine, wherein:
the malware detection engine is configured to monitor a behavior of a target software entity executing on the computer system to determine whether the target entity is malicious; and
the engine steering module is configured to:
in response to a trigger event caused by the target software entity, initiate writing of an entity profile of the target software entity to a non-volatile storage medium of the computer system, the entity profile comprising a plurality of attribute values characterizing the behavior of the target software entity,
parse the entity profile to determine whether the entity profile matches a pre-determined profile signature, and
in response to a determination that the entity profile matches the profile signature, re-configure the malware detection engine according to the profile signature to alter a procedure of monitoring the behavior of the target software entity.
2. The computer system of claim 1, wherein:
the procedure of monitoring the behavior of the target software entity comprises selecting a model from a set of currently active malware detection models and applying the model to determine whether the target software entity is malicious; and altering the procedure comprises changing a composition of the set of currently active malware detection models.

3. The computer system of claim 2, wherein altering the procedure comprises causing the malware detection engine to switch from monitoring the target software entity using a first set of malware detection heuristics to monitoring the target software entity using a second set of malware detection heuristics.

4. The computer system of claim 1, wherein:
the procedure of monitoring the behavior of the target software entity comprises selecting a model from a set of currently active malware detection models and applying the model to determine whether the target software entity is malicious; and
altering the procedure comprises adjusting a parameter of the selected model, wherein the malware detection engine is configured to determine whether the target software entity is malicious according to a current value of the parameter.

5. The computer system of claim 4, wherein the parameter comprises a malware-indicative score output by the model.

6. The computer system of claim 1, wherein the entity profile is stored on the non-volatile storage medium as a text file.

7. The computer system of claim 1, wherein the profile signature comprises a predicate, and wherein determining whether the entity profile matches the profile signature comprises evaluating the predicate according to a content of the entity profile.

8. The computer system of claim 7, wherein the profile signature comprises a plurality of predicates including the predicate, and wherein the engine steering module is configured to determine that the entity profile matches the profile signature only if all of the plurality of predicates evaluate to TRUE.

9. The computer system of claim 1, wherein the profile signature comprises an on-match action indicator indicative of a manner of re-configuring the malware detection engine in response to a match of the profile signature.

10. The computer system of claim 1, wherein the engine steering module is further configured to, in response to the determination that the entity profile matches the profile signature, adjust a selected attribute value of the plurality of attribute values characterizing the behavior of the target software entity.

11. The computer system of claim 1, wherein the trigger event comprises a preliminary verdict of malice determined by the malware detection engine.

12. A computer security method comprising employing at least one hardware processor of a computer system to execute a malware detection engine and an engine steering module connected to malware detection engine, wherein:
executing the malware detection engine comprises monitoring a behavior of a target software entity executing on the computer system to determine whether the target entity is malicious; and
executing the engine steering module comprises:
in response to a trigger event caused by the target software entity, initiating writing of an entity profile of the target software entity to a non-volatile storage medium of the computer system, the entity profile comprising a plurality of attribute values characterizing the behavior of the target software entity,
parsing the entity profile to determine whether the entity profile matches a pre-determined profile signature, and in response to a determination that the entity profile matches the profile signature, re-configuring the malware detection engine according to the profile signature to alter a procedure of monitoring the behavior of the target software entity.

13. The method of claim 12, wherein:
the procedure of monitoring the behavior of the target software entity comprises selecting a model from a set of currently active malware detection models and applying the model to determine whether the target software entity is malicious; and
altering the procedure comprises changing a composition of the set of currently active malware detection models.

14. The method of claim 13, wherein altering the procedure comprises causing the malware detection engine to switch from monitoring the target software entity using a first set of malware detection heuristics to monitoring the target software entity using a second set of malware detection heuristics.

15. The method of claim 12, wherein:
the procedure of monitoring the behavior of the target software entity comprises selecting a model from a set of currently active malware detection models and applying the model to determine whether the target software entity is malicious; and
altering the procedure comprises adjusting a parameter of the selected model, wherein the malware detection engine is configured to determine whether the target software entity is malicious according to a current value of the parameter.

16. The method of claim 15, wherein the parameter comprises a malware-indicative score output by the model.

17. The method of claim 12, wherein the entity profile is stored on the non-volatile storage medium as a text file.

18. The method of claim 12, wherein the profile signature comprises a predicate, and wherein determining whether the entity profile matches the profile signature comprises evaluating the predicate according to a content of the entity profile.

19. The method of claim 18, wherein the profile signature comprises a plurality of predicates including the predicate, and wherein the engine steering module is configured to determine that the entity profile matches the profile signature only if all of the plurality of predicates evaluate to TRUE.

20. The method of claim 12, wherein the profile signature comprises an on-match action indicator indicative of a manner of re-configuring the malware detection engine in response to a match of the profile signature.

21. The method of claim 12, wherein executing the engine steering module further comprises, in response to the determination that the entity profile matches the profile signature, adjusting a selected attribute value of the plurality of attribute values characterizing the behavior of the target software entity.

22. The method of claim 12, wherein the trigger event comprises a preliminary verdict of malice determined by the malware detection engine.

23. A non-transitory computer-readable medium storing instructions which, when executed by at least one hardware processor of a computer system, cause the computer system to form a malware detection engine and an engine steering module connected to the malware detection engine, wherein:
the malware detection engine is configured to monitor a behavior of a target software entity executing on the computer system to determine whether the target entity is malicious; and the engine steering module is configured to:

in response to a trigger event caused by the target software entity, initiate writing of an entity profile of the target software entity to a non-volatile storage medium of the computer system, the entity profile comprising a plurality of attribute values characterizing the behavior of the target software entity, parse the entity profile to determine whether the entity profile matches a pre-determined profile signature, and in response to a determination that the entity profile matches the profile signature, re-configure the malware detection engine according to the profile signature to alter a procedure of monitoring the behavior of the target software entity.

*  *  *  *  *